United States Patent
Susnjara

(10) Patent No.: US 9,753,451 B2
(45) Date of Patent: Sep. 5, 2017

(54) SYSTEM FOR MANAGING TOOL LIFE ON CNC MACHINES

(71) Applicant: THERMWOOD CORPORATION, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 372 days.

(21) Appl. No.: 14/559,008

(22) Filed: Dec. 3, 2014

(65) Prior Publication Data

US 2016/0161939 A1  Jun. 9, 2016

(51) Int. Cl.
*G05B 19/4065* (2006.01)
*G05B 23/02* (2006.01)

(52) U.S. Cl.
CPC ........... *G05B 19/4065* (2013.01); *G05B 2219/37251* (2013.01); *G05B 2219/37252* (2013.01); *G05B 2219/50206* (2013.01)

(58) Field of Classification Search
CPC ...... G05B 19/4065; G05B 2219/37252; G05B 2219/37228; G05B 2219/37256
USPC ................ 700/159, 169, 175, 177
See application file for complete search history.

(56) References Cited

U.S. PATENT DOCUMENTS

| | | | |
|---|---|---|---|
| 6,202,002 B1 * | 3/2001 | Fainstein | G05B 19/4065 318/568.1 |
| 2009/0175694 A1 * | 7/2009 | Craig | B23B 51/00 407/37 |
| 2012/0109539 A1 * | 5/2012 | Hasegawa | B23Q 17/008 702/34 |

* cited by examiner

*Primary Examiner* — Michael J Brown
(74) *Attorney, Agent, or Firm* — Bookoff McAndrews, PLLC

(57) ABSTRACT

A system for managing the longevity of tools of a programmable CNC machine including means for inputting into the machine control a designation of a tool for use therein, means for recording the time of usage of such tool, means for computing the cumulative time of usage of such tool over a lifetime of usage thereof, means for computing the average time of usage of such tool and means for signaling the usage of such tool for a selected percentage of such average time.

20 Claims, 2 Drawing Sheets

SYSTEM FOR MANAGING TOOL LIFE ON CNC MACHINES

This invention relates to a system for managing the use of cutting tools in CNC machines.

BACKGROUND OF THE INVENTION

In the use of CNC machines for machining various workpieces, it often has been the common practice for machine operators to determine the extent of usage and corresponding replacement of a cutting tool. Often, however, such judgment proves to be faulty, resulting in the use of worn tools, defective parts and the scrapping of such parts. In an effort to avoid such circumstances, certain machine control systems have been devised in a manner whereby an estimated time of usage of a tool is entered into such system, the times of usage of the tool is entered into such systems and subtracted from such estimated time and the expiration of the estimated time of usage is signaled to the operator indicating the necessity for replacement of the tool.

While such practice has been an improvement over prior practice, it has several serious shortcomings. The operator must know or be able to estimate a reasonable tool life in such an approach to have any value but seldom is sufficiently skilled, knowledgeable or experienced to make a suitable estimate. If originally estimated tool life values are found to be in appropriate as found in actual use, the operator is required to determine and enter a revised tool life value. When working with a wide variety to tools, such an adjustment is likely to be not only similarly imprecise in value but time consuming in accomplishing, negatively affecting productivity.

In view of the foregoing, it is this principal object to of the present invention to provide a system for determining and indicating the useful life of a tool of a CNC machine, diminishing the use of worn tools, the attendant production of misconfigured workpieces and improving productivity.

SUMMARY OF THE INVENTION

The principal object of the present invention is achieved by providing a system for managing the effective functional longevity of each cutting tool of a given type, geometry and operating characteristic, operably mounted on a programmable CNC machine, including means for inputting into the control means of such machine, a designation of a tool for use therein, means for recording the time of usage of such tool, means for computing the cumulative time of use of such tool over the lifetime of usage of such tool, means for computing the average time of usage of such tool and means for signaling the usage of such tool for a selected percentage of such average time. In the preferred embodiment of the invention, the system is functional in signaling 85% of the usage of the average time of use of the tool, indicating a substantial usage of the tool, and 95% of such usage, alerting a warning and required replacement of the tool.

DETAILED DESCRIPTION OF THE PREFERRED EMBODIMENT OF THE INVENTION

Figure 1:
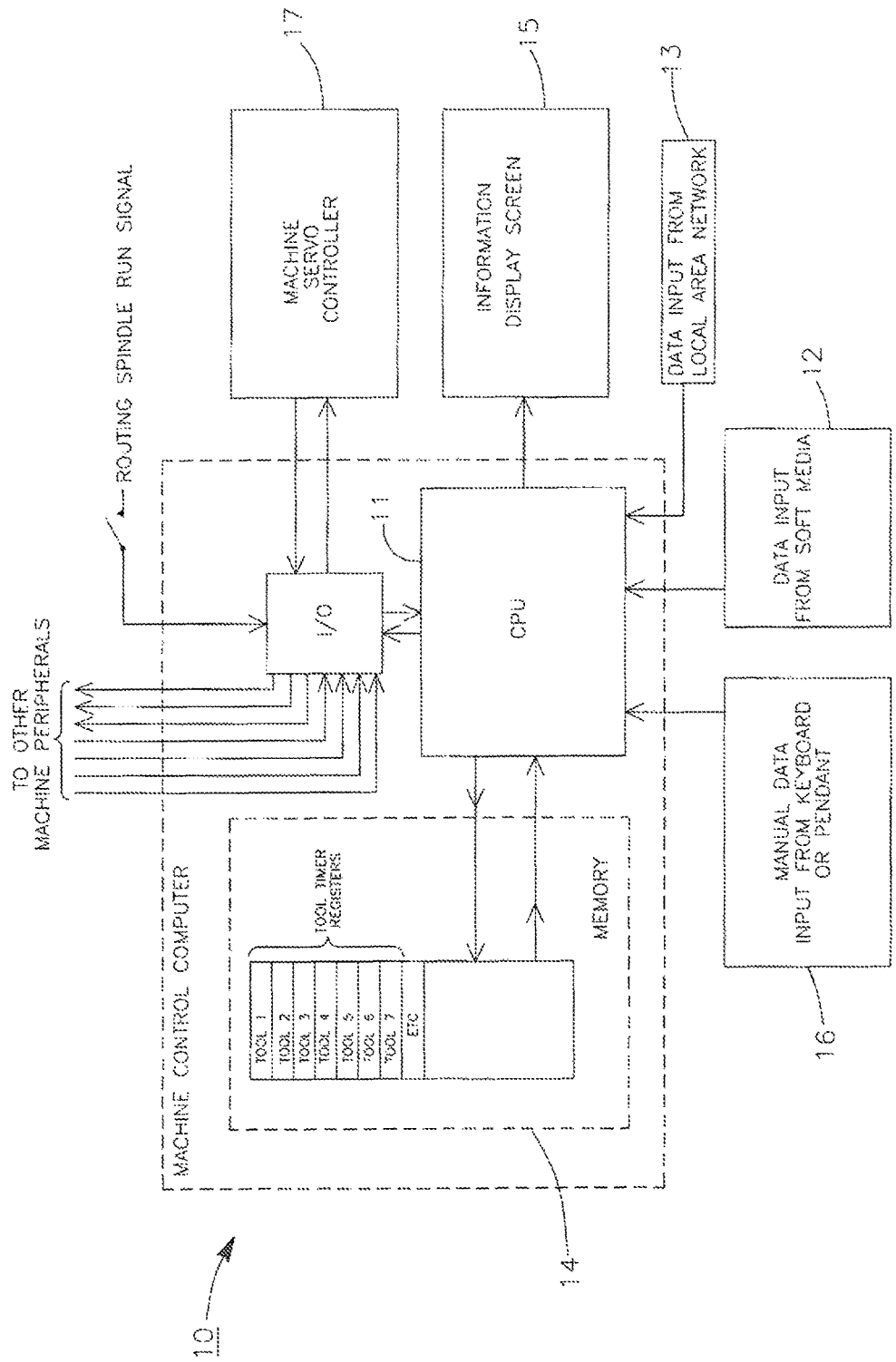
FIG. 1 is a block diagram of the control system of a CNC machine including the system of the present invention.
Figure 2:
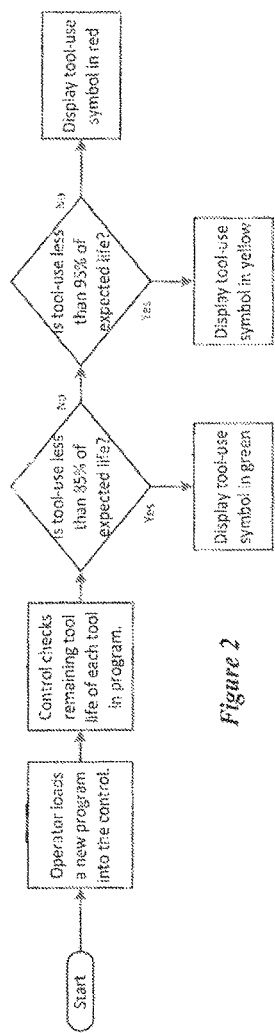
FIG. 2 is a flow diagram indicating the functioning of a portion of the system shown in FIG. 1, upon an operator loading a new program into such system.
Figure 3:
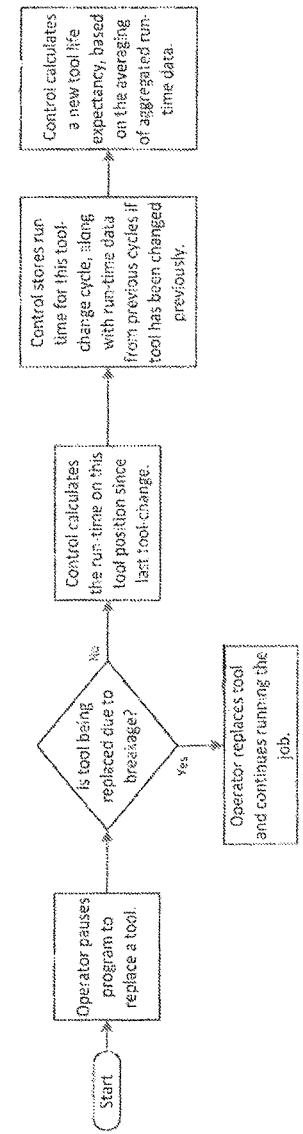
FIG. 3 is a flow diagram further indicating the functioning of a portion of the system shown in FIG. 1 upon an operator pausing an inputted program to replace an installed tool.

Referring to FIG. 1 of the drawings, there is illustrated a block diagram of a control computer 10 of a CNC machine, incorporating the present invention. The computer includes a central processing unit 11 functional upon input of program data from local and remote input devises 12 or 13 to operate servo controller 17 in the selection and operation of various cutting tools in machining a workpiece loaded on the workable of the machine. The CPU further is functional pursuant to an inputted program to monitor the usage time of each tool of the machine stored thereon, accumulate and register such usage time in a memory 14, compute and store the average time of usage of each of such tools, designate the extent of usage of each tool on a display screen 15 and inquire whether the removal of a tool from the tool holder of the machine is for the reason of completion of current usage or breakage of the tool whereupon the usage data of such broken tool is deleted from memory. Such tool removal cause is indicated by means of an operator input device 16.

In the use of the system as described, initially the operator loads a program to be used into the control of the machine whereupon the control determines the remaining tool life of each tool in the program. If the tool usage is determined to be less than 85% of the expected life of such tool, the computer would so indicate on the display screen and the machine would proceed with the use of the tool in machinery the workpiece. If not, the computer would next determine if the expected life of the tool is less than 95% of the expected life of the tool. If so, the computer would so indicate on the display screen. If not, the computer would similarly so indicate on the display screen.

Upon the operator pausing the machine, the control would inquire by means of the display screen whether the tool is being displaced due to breakage. If so, the operator would so respond by means of input device 16, replace the tool and continue the operation of the machine as previously described. If not, indicating that the tool is being replaced due to excessive wear, the operator would so respond and the computer would calculate the usage time of the tool being replaced since the last tool change, store the usage time for the current and previous use cycles if the tool has been changed previously and calculates the new tool life expectancy based on the averaging of aggregated usage time of the tool.

Preferably, a touch screen is used to indicate operating conditions and inquiries of the machine, and commands and responses of the operator. The various conditions of each tool may be designated by different colors, and responses of the operator may be made by touching selected portions of the screen.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A method to determine tool life of a tool of a CNC machine, the method comprising:
   removably coupling a first tool to the CNC machine;
   monitoring a usage time of the first tool; and
   determining a percentage of use of the first tool, wherein the percentage of use is determined based on the monitored usage time of the first tool as a function of a usage time of at least one other tool different than the first tool, wherein the at least one other tool was uncoupled from the CNC machine prior to removably coupling the first tool to the CNC machine so that the first tool and the at least one other tool are configured to interchangeably couple to the CNC machine.

2. The method of claim 1, further comprising uncoupling the first tool from the CNC machine and removably coupling a second tool, wherein the first tool is different than the second tool.

3. The method of claim 2, further comprising determining a percentage of use of the second tool, wherein the percentage of use of the second tool is determined based on a monitored usage time of the second tool as a function of the usage time of the first tool and the usage time of the at least one other tool.

4. The method of claim 2, wherein each of the first tool, the second tool, and the at least one other tool are configured to perform a common function.

5. The method of claim 1, further including uncoupling the first tool from the CNC machine when the percentage of use reaches or exceeds a selected percentage.

6. The method of claim 1, further including determining if the percentage of use of the first tool exceeds a threshold percentage.

7. The method of claim 6, wherein the threshold percentage is 85%.

8. The method of claim 6, wherein the threshold percentage is 95%.

9. The method of claim 1, wherein each of the first tool and the at least one other tool are configured to perform a common function.

10. The method of claim 1, wherein each of the first tool and the at least one other tool are configured to perform a different function.

11. The method of claim 1, wherein the at least one other tool includes a plurality of tools different than the first tool, and wherein the usage time of the at least one other tool different than the first tool, includes averaging a usage time of each of the plurality of tools different than the first tool.

12. The method of claim 1, wherein the at least one other tool was uncoupled from the CNC machine prior to removably coupling the first tool to the CNC machine due to at least one of excessive wear or failure.

13. The method of claim 1, wherein the monitoring and determining are performed via a processor on a controller of the CNC machine.

14. A method to determine tool life of a tool of a CNC machine, the method comprising:
   removably coupling a first tool to the CNC machine;
   monitoring a usage time of the first tool;
   determining a percentage of use of the first tool, wherein the percentage of use is determined based on the monitored usage time of the first tool as a function of a usage time of at least one other tool different than the first tool, wherein the at least one other tool was uncoupled from the CNC machine prior to removably coupling the first tool to the CNC machine so that the first tool and the at least one other tool are configured to interchangeably couple to the CNC machine;
   signaling whether the percentage of use of the first tool reaches or exceeds a threshold percentage; and
   uncoupling the first tool from the CNC machine and removably coupling a second tool, wherein the first tool is different than the second tool.

15. The method of claim 14, further comprising determining a reason for uncoupling the first tool.

16. The method of claim 14, further comprising determining a percentage of use of the second tool, wherein the percentage of use of the second tool is determined based on a monitored usage time of the second tool as a function of the usage time of the first tool and the usage time of the at least one other tool.

17. The method of claim 14, wherein each of the first tool, the second tool, and the at least one other tool are configured to perform a common function.

18. The method of claim 14, wherein the threshold percentage is 85%.

19. The method of claim 14, wherein the threshold percentage is 95%.

20. The method of claim 14, wherein the at least one other tool includes a plurality of tools different than the first tool, and wherein the usage time of the at least one other tool different than the first tool, includes averaging a usage time of each of the plurality of tools.

* * * * *